(Model.)

E. N. CAMP.
MORTISING AND BORING MACHINE.

No. 317,721. Patented May 12, 1885.

WITNESSES:
H. McArdle
C. Sedgwick

INVENTOR:
E. N. Camp
BY Munn & Co.
ATTORNEYS.

(Model.)

E. N. CAMP.
MORTISING AND BORING MACHINE.

No. 317,721. Patented May 12, 1885.

WITNESSES:

INVENTOR:
E. N. Camp
BY Munn & Co.
ATTORNEYS.

UNITED STATES PATENT OFFICE.

EDMOND N. CAMP, OF PUCKETT, GEORGIA.

MORTISING AND BORING MACHINE

SPECIFICATION forming part of Letters Patent No. 317,721, dated May 12, 1885.

Application filed November 7, 1884. (Model.)

*To all whom it may concern:*

Be it known that I, EDMOND N. CAMP, of Puckett, in the county of Coweta and State of Georgia, have invented a new and Improved Mortising and Boring Machine, of which the following is a full, clear, and exact description.

My invention consists of improvements in mortising and boring machines adapted to facilitate the making of a series of mortises or boring a series of holes at once at any predetermined distance apart, and particularly for doing the same in curved bars of wood, such as the back parts of chairs and the like, all as hereinafter fully described.

Reference is to be had to the accompanying drawings, forming part of this specification, in which similar letters of reference indicate corresponding parts in all the figures.

Figure 1:
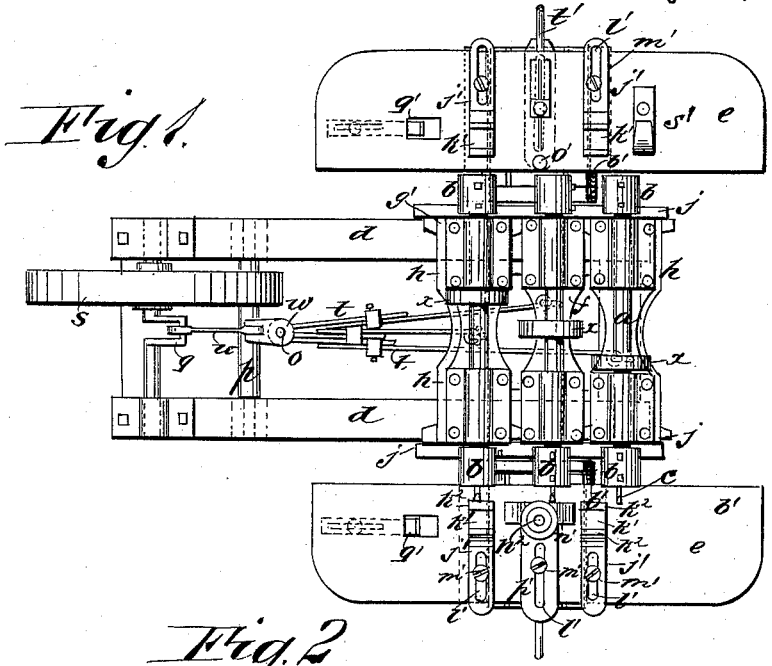
Figure 2:
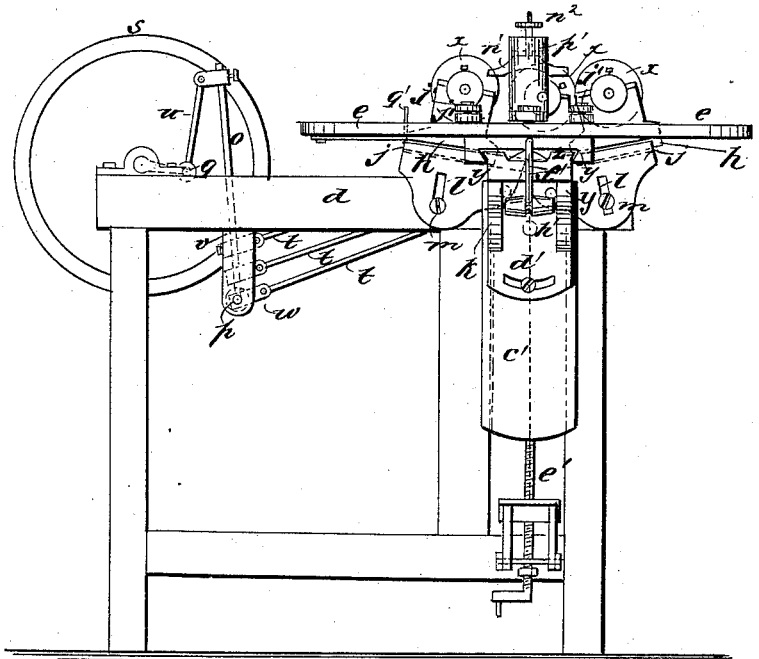
Figure 3:
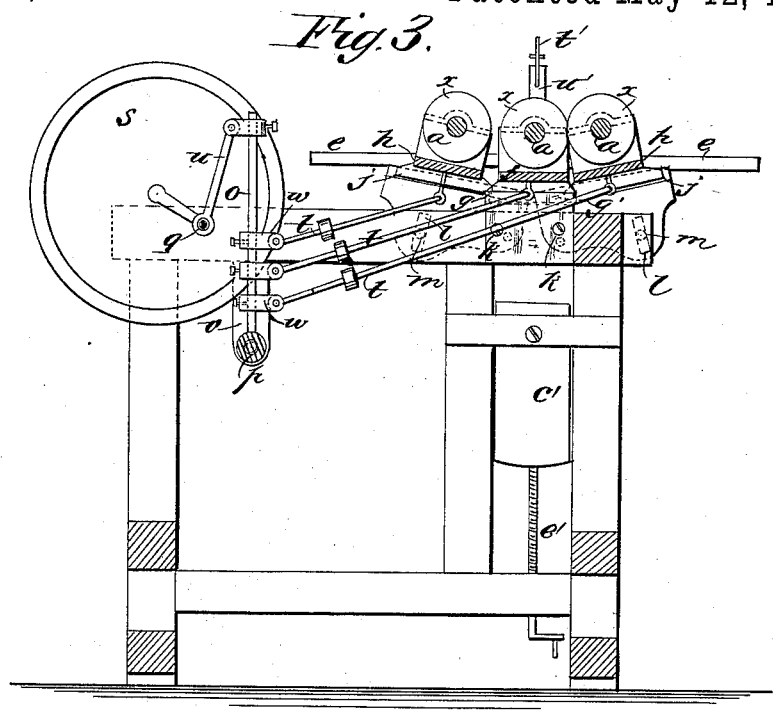
Figure 4:
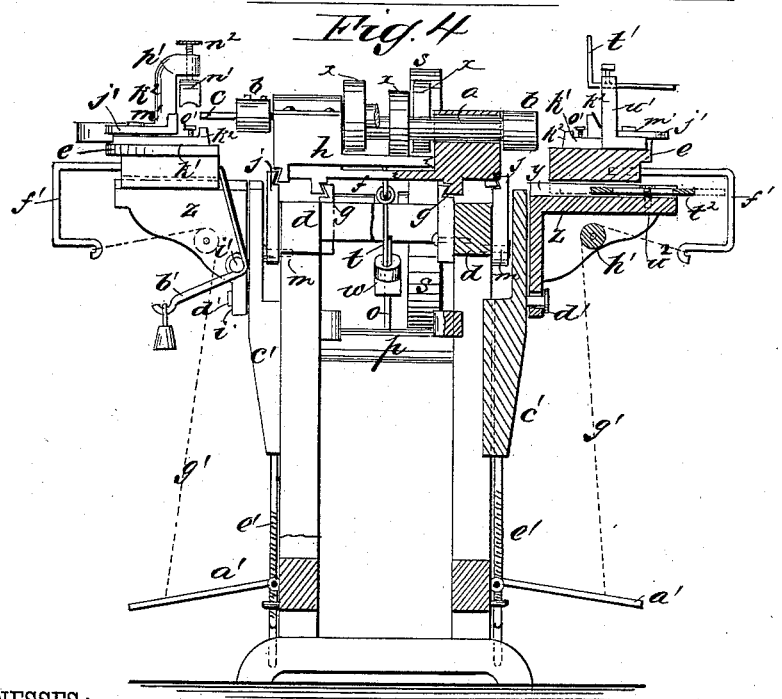

Figure 1 is a plan view of my improved mortising and boring machine. Fig. 2 is a side elevation. Fig. 3 is a longitudinal sectional elevation, and Fig. 4 is partly an end elevation and partly a transverse section.

I mount three mandrels, $a$, having a chuck, $b$, adapted to hold a rotary mortising-tool, $c$, or a boring-bit on each end, side by side, on the top of a suitable frame, $d$, with a work-holding table, $e$, fronting each end of said mandrels, placing the middle mandrel $a$ on the carriage $f$, fitted to reciprocate in ways $g$, permanently fixed to the frame $d$, and placing the other mandrels on independent carriages $h$, fitted to reciprocate in ways $j$, pivoted to the frame at $k$ and adjustable at the outer ends by the slot $l$ and clamp-screw $m$, or other suitable means, to adjust said carriages to run or be set in the same plane as the middle carriage for working on straight bars, or to run or be set obliquely to said middle carriage for boring or mortising curved bars, such as the back parts of chairs and other bars of curved form. When the machine is to be used for boring, the carriages are adjusted along these ways according to the distance apart the holes are required to be, and secured in position by set-screws, clamps, or other means; but for making mortises the carriages are to be reciprocated the length of the mortises, for which I connect them to the rock-lever $o$, mounted on the supporting-pivot $p$, and suitably connected to the crank $q$ on the shaft of the pulley $s$, on which a belt runs for the purpose of operating said carriages. The carriages are connected with said rock-lever by extensible rods $t$, to enable the carriages to be shifted toward or from each other for altering their positions according to the different distances apart the mortises are required to be. The rods are adjustable along said lever $o$ to alter the length of the movements of the carriages according to the required length of the mortises, and the rod $u$, connecting the rock-lever $o$ with the crank, is adjustable along said lever to alter the length of its range as may be required. The pivot $p$, on which the rock-lever works, is suspended in hangers $v$, that may be adjustable to alter the position of the lever in case it may be required for material alteration of the throw of the same.

To make the mortises all exactly the same length, the rods $t$ should all be connected to lever $o$ at the same distance from pivot $p$, particularly when very short mortises are made; but practically the lengths will not vary to any appreciable extent when the rods $t$ are set high up on the lever $o$ and the connecting-collars $w$ are set close together. If preferred, there may be a separate lever, $o$, for each carriage, so that all the connecting-rods may be set exactly alike.

The mandrels are each provided with a pulley, $x$, to be driven by separate belts from the counter-shaft.

The work-holding tables $e$ are mounted in ways $y$ on the supporting-brackets $z$, to slide toward and from the mandrels, and are connected with foot-levers $a'$ to be moved forward, and with weighted levers $b'$ to be moved backward.

The brackets $z$ are mounted on vertically-adjustable slides $c'$, to alter the height of the work, and they are also pivoted to said slides at $d'$, to be tilted sidewise for the proper adjustment of taper bars to the tools when the holes are to be bored at right angles to the plane of the taper.

The slides $c'$ have the usual adjusting-screws, $e'$, for altering them, and the work-holding tables $e$ are connected to the foot-levers $a'$ by the bent rods $f'$, reaching under the brackets, and the cords $g'$, passing over the guide-pulleys $h'$. The weighted levers $b'$, for pushing the tables $e$ back, are pivoted at $i'$, and bear against the inner ends of said tables.

The tables $e$ have work-holding cleats $j'$, constructed with adjustable jaws $k^2$, forming seats $k'$ for the bars to be clamped and held in, said cleats being also adjustable along the tables toward and from the mandrels by the slots $l'$ and clamp-screws $m'$, in which holders the bars to be bored or mortised are secured by the clamp $n'$, and there is an adjusting-screw, $o'$, in the table, under the clamp, to be set higher or lower, according as the bars are curved or straight, to clamp the bars on it also, and prevent them from being sprung between the cleats $j'$. The clamps $n'$ are fitted by adjusting-screws $n^2$ to the supporting-brackets $p'$, which are also adjustable along the table, like the cleats $j'$, by a slot, $l'$, and clamp-screw $m'$.

Near one end of each table $e$ is an adjustable stop, $q'$, by which to adjust the bars to be bored or mortised for gaging the holes or mortises from the end, and near the other end of one or both of the tables, as preferred, is a stop, $s'$, having a hook end adapted to hook into the arm-mortise of a back chair-post, to serve for a gage by which to adjust the post to the boring-tools when the holes are to be bored in the post for the rods connecting the front and back posts of a chair below the seat. Said stop may also be used to gage the same post by the lower mortise for the back bars above the seat when the holes are to be bored for the rods connecting the back posts below the seat.

For gaging the round front posts so as to bore the holes for the front rods a little oblique to the holes for the side rods, as required by the flare of the side rods from back to front, I employ an angle-rod, $t'$, held in the top of a bracket, $u'$, by a set-screw, the vertical part of which rod is suitably inclined to the plane of the mandrels to hold the posts at the proper angle by inserting said rod in one of the holes previously bored for the rods of, say, the front, and controlling the position thereby while the holes are being bored for the rods of the side of the chair-frame.

The corresponding inclinations of the holes and mortises in the respective sides of the back part may be gaged by adjusting the seats $k'$, to give said bars the requisite pitch of inclination when making the holes for the flaring rods.

The depth of the mortises and holes is gaged by adjustable stops $t^2$, fitted in the ways $y$ under the table, to be set forward or backward, as required, by clamp-screws $u^2$, and having any suitable stop device against which the tables will be arrested when being shifted forward to carry the work up to the tools.

For adjusting tapered rods or bars for boring or mortising them in the plane of the taper the work-holding cleats may be adjusted one in advance of the other.

It will be seen that with this improved machine one hole or mortise may be made on one side or both sides of said machine, or two or more may be made either in line or out of line, and of any required depth, at the same time; and said holes or mortises may be made parallel or oblique to the surface of the bars, as required; but it is to be understood that boring and mortising cannot be done at the same time—that is, boring on one side and mortising on the other—because the carriages have to be at rest while boring and must reciprocate while mortising. It is to be understood that the rods $t$ are to be disconnected when the machine is to be used for boring.

Having thus described my invention, what I claim as new, and desire to secure by Letters Patent, is—

1. A series of two or more boring and mortising mandrels arranged on reciprocating carriages, the outer mandrels having their carriages supported upon ways pivoted to the supporting-frame, the outer ends of said ways being adjustable to set the outer mandrels at an angle to the intermediate mandrel or mandrels, in combination with the work-holding devices and means for reciprocating the carriages of said outer mandrels, substantially as and for the purpose set forth.

2. The combination of the vertically-adjustable and side tilting table with a series of two or more boring or mortising mandrels arranged on reciprocating carriages, the carriages of the outer mandrels being supported upon pivoted ways, the outer ends of said ways being adjustable to set the outer mandrels at an angle to the intermediate mandrel or mandrels, substantially as described.

3. The combination of the rock-lever $o$ and extensible connecting-rods $t$ with the mandrels $a$, mounted on reciprocating carriages, said rock-lever being connected with the crank of a driving-pulley, substantially as described.

4. The adjustable work-holding cleats $j'$, having vertical slots $l$, which receive set-screws $m$, said cleats also having adjustable jaws $k^2$, sliding in seats $k'$, clamps $n'$, supported in a longitudinally-adjustable bracket, $p'$, disposed intermediately of the jaws $k^2$, gage $q'$, adjustable in a plane at right angles to the plane of movement of the cleats $j'$, and the adjustable work-holding table $e$, having the boring and mortising mandrels $a$, substantially as described.

5. The adjusting-screw $o'$ in the work-table $e$, in combination with the cleats $j'$, disposed one at each side of said screw, clamp $n'$, supported in a bracket, $p'$, overhanging said screw, and the mandrels $a$, arranged to operate upon the work at right angles to the clamping action of the aforesaid clamp and screw, substantially as described.

6. The combination of the hook-stop $s$ with the table $e$, cleats $j'$, arranged in parallel planes with the said stop, adjusting-screw $o'$, clamp $n'$, supported in a bracket, $p'$, disposed adjustably and intermediately of the cleats $j'$, and the mandrels $a$, substantially as described.

7. The angle-gage $t'$, held in an angular bracket, $u'$, in combination with the work-holding cleats $j'$, supported adjustably upon table $e$, and the mandrels $a$, said angle-gage being disposed intermediately of and in a plane above the said cleats, substantially as and for the purpose set forth.

8. The combination of the adjustable stop $t^2$, fitted in a slot, $y$, in the table-supporting bracket, and adapted to gage the depth of the mortises and holes, with the mandrels $a$ and the table $e$, having the cleats $j'$, substantially as and for the purpose set forth.

EDMOND N. CAMP.

Witnesses:
J. T. MAYFIELD,
F. S. CURETON.